Patented May 1, 1928.

1,667,928

UNITED STATES PATENT OFFICE.

ROBERT L. CORBY, OF NEW YORK, AND FREEMAN M. SCALES AND WILHELM H. F. BÜHRIG, OF MOUNT VERNON, NEW YORK, ASSIGNORS TO THE FLEISCHMANN COMPANY, OF NEW YORK, N. Y., A CORPORATION OF OHIO.

METHOD OF TREATING MOLASSES.

No Drawing.   Application filed May 11, 1925.   Serial No. 29,616.

This invention relates to the treatment of impure sacchariferous solutions for use in the fermentation industries and more particularly to the clarification of molasses for use in the manufacture of yeast, and has as a general object the carrying out of such treatment in an efficient and economical manner.

A more particular object of the present invention is the treatment of commercial cane molasses or a mixture of sacchariferous materials containing cane molasses for the purpose of removing therefrom certain substances ordinarily present therein which tend seriously to interfere with the use thereof in processes of manufacturing bakers' yeast.

A further object of the invention is so to carry out the treatment or clarification of the molasses as to increase its rate of filtration and to improve its quality as a source of sugar material for manufacture of bakers' yeast, by removing therefrom such substances as tend to inhibit the filtration thereof and deleteriously to effect the yeast produced therefrom.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

In recent years the use of molasses, including both cane and beet molasses, as a sugar source in the fermentation industries has come into increased favor and particularly the use thereof as the principal or exclusive source of sugars available for yeast growth in processes of manufacturing bakers' yeast. In such use, however, more or less difficulty has been experienced in obtaining the desired results as to quality and yield of yeast, especially when using cane molasses as a source of at least a considerable portion of the sugar material.

Cane molasses as usually obtained on the market is generally unsuitable for fully satisfactory use without previous treatment in the manufacture of bakers' yeast for the reason that it usually contains considerable amounts of sediment and mucilaginous, colloidal and coloring substances of unknown composition, including sand, plant tissue, pectinous substances, caramel, etc., together with certain undesirable salts of the heavier metals such as copper, iron, etc., and undesirable excesses of salts of metals of the alkaline earth type, such as calcium, etc., in solution. This content of undesirable constituents is of such a nature that it not only renders the filtration of the molasses difficult, but if allowed to remain in the molasses, is detrimental, from the standpoint of the yeast manufacturer, for the reason that it tends deleteriously to affect the baking and keeping qualities of the yeast, causing weakening and discoloration thereof and rendering it less than perfect from a commercial standpoint.

On the other hand, it is desirable to carry out the clarification of the molasses by a process which will not result in a loss from the molasses of any appreciable amounts of those constituents such as sugar, nitrogen and phosphorus, which are deemed to be desirable by the yeast manufacturer, while at the same time the process must be such that the clarified molasses shall not be burdened with appreciable amounts of added undesirable constituents such as calcium etc. Also it is desirable that the clarified liquor should not re-act to any great extent with the manufacturing apparatus in which the treatment is carried on. Such apparatus in yeast factories is largely composed of copper and brass.

According to the present invention such clarification of the molasses is accomplished by diluting the same and rendering it distinctly alkaline by the addition thereto of suitable alkaline compounds of sodium or a mixture of such compounds, as, for example, sodium hydroxide, sodium carbonate, or sodium bicarbonate, and thereafter adding thereto a suitable substance capable of forming therein a phosphate precipitate, as, for example, phosphoric acid or the phosphates of ammonium, potassium or sodium or of commercial superphosphate, the molasses being heated moderately to complete the formation of the precipitate, and separated from the residue by settling and/or filtration in any suitable manner with or without the aid of the well known aids to filtration such, as, for example, kieselguhr, Filtercel, diatomite, etc.

The following is a specific example of the method of carrying out the process:

The molasses is diluted with water to about 15° or 20° Balling and is heated moderately, as, for example, to from 70° to 95° C., whereupon sufficient sodium bicarbonate is added to render the diluted molasses distinctly alkaline, as, for example, to a degree such that about 3.0 cc. of normal sulphuric acid solution will be required to neutralize 100 cc. thereof, litmus being used as an indicator.

After the diluted molasses has been rendered akaline as described, there is added thereto a quantity of phosphoric acid, sufficient to form a voluminous precipitate, as for example about 0.5% of the original weight of the molasses under treatment before dilution and about 0.3% of Filtercel on the same basis. The mass is then mixed thoroughly and allowed to stand for from 1 to 2 hours during which time a large bulk of the precipitate settles to the bottom, whereupon the supernatant liquid may be drawn off and filtered by any suitable means as for example through an ordinary filter press or Sweetland filter, which may if desired have been previously pre-coated with a small amount of Filtercel or the like.

It will be understood that the above procedure is merely illustrative of the way in which the present invention may be carried out and the quantity of alkali substances added may be varied in accordance with the variation of initial acidity of the molasses and according to the type of phosphorus-containing precipitant used. For example, with the use of a phosphate in place of the phosphoric acid above specified, the initial alkalinity may need be in some cases only such that about 1.0 cc. of normal sulphuric acid solution will be required to neutralize 100 cc. of the alkaline molasses, it being desirable in all cases, however, to use such amounts of the alkaline reagent that the molasses will remain slightly alkaline after the addition thereto of the phosphorus-containing precipitant.

Moreover, the heat treatment of the molasses may if desired be carried on subsequent to the addition to the molasses of the alkaline and precipitating reagents and under certain conditions it may be found to be desirable to add the precipitating reagent fractionally, allowing short intervals of time, as, for example, about 5 minutes between such additions. Also the settling period may be omitted and for purposes of accuracy on various lots of molasses, the particular amounts of reagents to be used may be ascertained with accuracy by first treating small aliquots with varying amounts of the reagents.

It has been found that cane molasses clarified in accordance with the present process may be filtered at approximately double the rate of molasses clarified by the heretofore known processes and that it may be used in yeast manufacture with excellent results in any of the usual commercial processes employing molasses, producing a yeast having good color and excellent baking and keeping qualities.

Prior to such use in yeast manufacture, or preferably during the preparation of the mash, the molasses should be rendered slightly acid to a degree favorable to yeast growth, as, for example, by the addition of a mineral acid such, as, for example, sulphuric acid. Such an acidity might be one which requires about 0.5–0.8 cc. of normal sodium hydroxide to neutralize 100 cc. of the liquid. Thereafter any desired substances may be added thereto in the usual manner to form a balanced yeast nutrient, and the propagation of yeast therein with aeration may be commenced.

Since certain changes in carrying out the above process, and certain modifications in the composition, which embody the invention may be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language, might be said to fall therebetween.

Having described our invention, what we claim as new, and desire to secure by Letters Patent is:

1. A method of treating molasses adapted for use in the fermentation industries, which consists in rendering the molasses distinctly alkaline with an alkaline sodium compound, adding thereto a water-soluble phosphorus-containing precipitant, heating the mixture moderately and thereafter separating the solution from the substances undissolved therein, the reagents being so proportioned that immediately prior to heating the reaction of the mixture is slightly alkaline to litmus.

2. A method of treating molasses for use in the manufacture of yeast by an aeration process, which consists in rendering the molasses distinctly alkaline with a carbonate of sodium, adding thereto a water-soluble phosphorus-containing precipitant, heating the mixture moderately and thereafter separating the solution from the substances undissolved therein, the reagents being so proportioned that immediately prior to heating the reaction of the mixture is slightly alkaline to litmus.

3. A method of treating molasses for use in the manufacture of yeast by an aeration process, which comprises rendering the molasses distinctly alkaline with bicarbonate of soda, adding thereto a water-soluble phosphorus-containing precipitant, heating the mixture moderately and thereafter separating the solution from the substances undissolved therein, the reagents being so proportioned that immediately prior to heating the reaction of the mixture is slightly alkaline to litmus.

4. A method of treating cane molasses for use in the manufacture of yeast by an aeration process, which consists in rendering the molasses distinctly alkaline with an alkaline sodium compound, adding thereto an acid compound of phosphorus adapted to form a precipitate therein, heating the mixture and thereafter separating the solution from the substances undissolved therein, the reagents being so proportioned that immediately prior to heating the reaction of the mixture is slightly alkaline to litmus.

5. A method of treating cane molasses for use in the manufacture of yeast by an aeration process, which consists in rendering the molasses distinctly alkaline with an alkaline sodium compound, adding thereto phosphoric acid in amounts sufficient to form a voluminous precipitate but leaving the molasses alkaline, heating the mixture and thereafter separating the solution from the substances undissolved therein, the reagents being so proportioned that immediately prior to heating the reaction of the mixture is slightly alkaline to litmus.

6. A method of preparing molasses for use in the manufacture of yeast by an aeration process, which comprises diluting the molasses moderately, adding thereto an amount of sodium bicarbonate sufficient to produce therein an alkalinity equal to 3.0 cc. of normal sulphuric acid per 100 cc. heating the mixture moderately, adding thereto an amount of phosphoric acid equal to about 0.5% of the weight of original molasses together with about 0.3% of a filtering aid, mixing the mass thoroughly, allowing the mass to stand for about 2 hours, and filtering off the supernatant liquid.

In testimony whereof we affix our signatures.

ROBERT L. CORBY.
FREEMAN M. SCALES.
WILHELM H. F. BÜHRIG.